Feb. 19, 1963 L. BRANDES ET AL 3,077,632
METHOD OF FILLETING FISH
Filed Sept. 14, 1960 4 Sheets-Sheet 1

INVENTORS:
L. Brandes and J. Michael
BY
Richards & Geier
ATTORNEYS

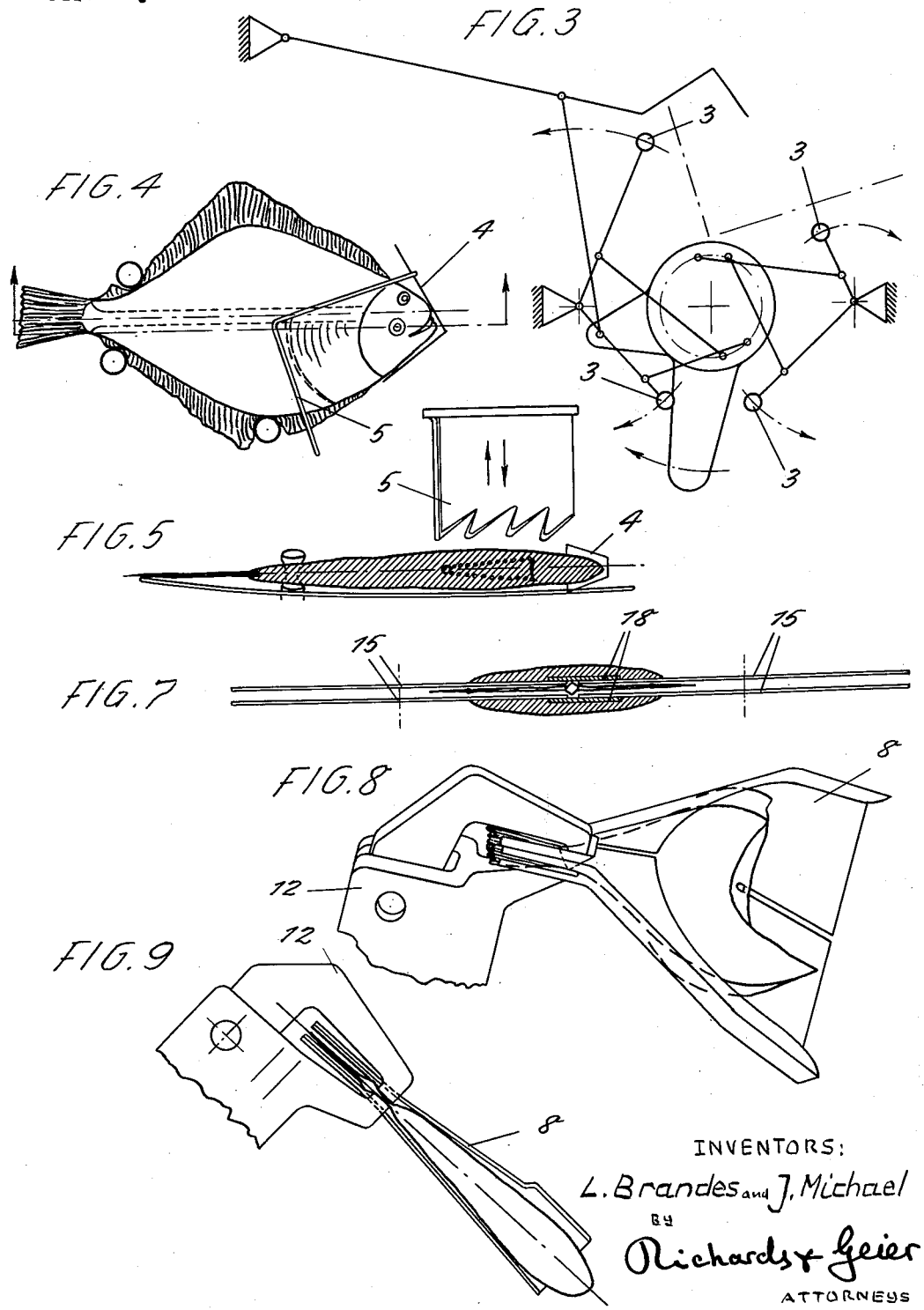

Feb. 19, 1963 L. BRANDES ETAL 3,077,632
METHOD OF FILLETING FISH
Filed Sept. 14, 1960 4 Sheets-Sheet 3

INVENTORS:
L. Brandes and J. Michael
BY
Richards & Geier
ATTORNEYS

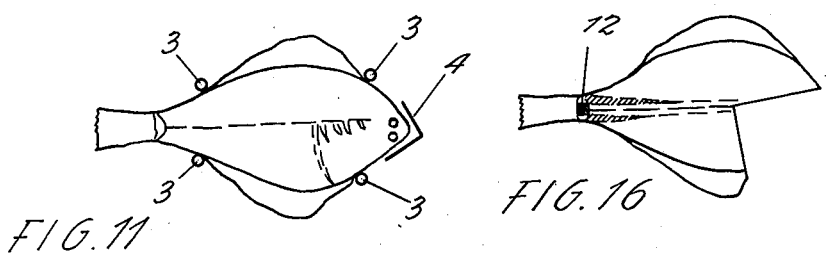
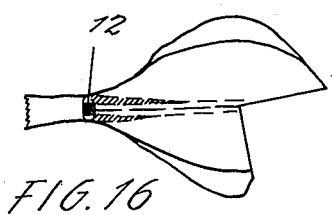
FIG.11　　FIG.16
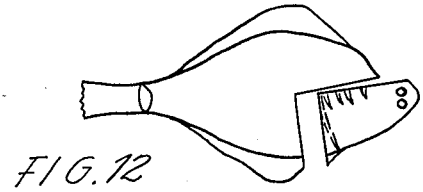
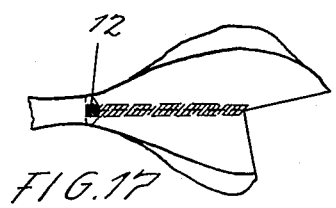
FIG.12　　FIG.17
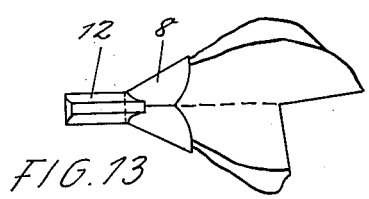
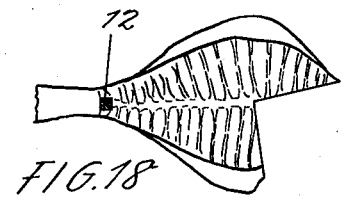
FIG.13　　FIG.18
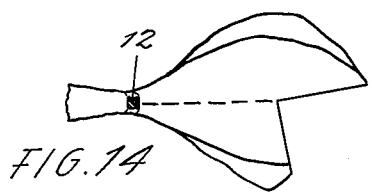
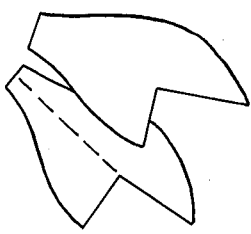
FIG.14　　FIG.19
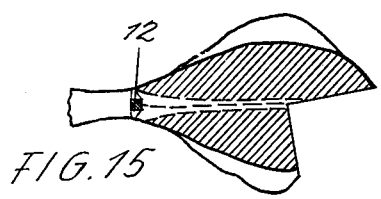
FIG.15

United States Patent Office 3,077,632
Patented Feb. 19, 1963

3,077,632
METHOD OF FILLETING FISH
Lothar Brandes, Lubeck, and Johannes Michael, Ratzeburg, Germany, assignors to Nordischer Maschinenbau Rud. Baader, Lubeck, Germany, a firm
Filed Sept. 14, 1960, Ser. No. 56,043
Claims priority, application Germany Sept. 19, 1959
4 Claims. (Cl. 17—45)

The invention relates to a method of filleting fish in which the cutting of the fillets is effected by two cuts in the back and two cuts in the belly.

The mechanical filleting of fish comprises in its most usual form a series of operational stages, such as beheading, measuring, cutting free the dosal muscle and of the abdominal muscle from the vertebral column or backbone, severing the strips of flesh between the fillet and the bone, cutting off the belly strips, separating the fillets backbone, cutting off the belly strips, separating the fillets from the root of the tail and so forth. In the case of the usual method, the fish is either pulled by the tail fin or straddled with the aid of its belly cavity and pushed or fed by conveyor belts engaging the flanks of the fish. The two last mentioned methods do not come into question for fish which are slim at the root of the tail, for example flat fish, and the first method can also not be employed on account of the fin of the tail of these fish being of an entirely different construction. To attempt to grip the fish of this kind by the tail fin would require clips 25 to 35 millimeters in width. Even then, however, reliable guiding of the bones and fillets is impossible. Using a toothed clip 15 millimeters in width which gripped the fish by the vertebrae of the backbone at the root of the tail was unsuccessful because the fish does not lie positively aligned either as regards its height position or its transverse position. In addition it is immediately torn out of the clip on encountering relatively great resistance.

Particularly the fact of the fish being torn out of the clip made it necessary to seek some other way of holding the fish so firmly and reliably that, even when relatively great resistance is encountered, the backbone will be pulled asunder before the fish is torn out of the clip. As it is also obvious that the tearing off of the backbone cannot be tolerated in a perfect filleting method, it was necessary to endeavour to effect the conveyance of the fish through the machine with as little resistance as possible. It was then found that such low-resistance conveyance necessitated preparation of the fish for the beheading operation, so that a new method of beheading had to be devised which in combination with a novel type of engagement of the fish by the tail clip on the flat bone preceding the tail fin, produced an absolutely firm and reliable guiding without danger of the fish being torn out of the clip or the backbone being pulled asunder. It was, however, also found that this problem could only be partially solved thereby if a number of other method stages were introduced. Consequently an almost completely new method had to be devised in which only the gripping with the clip and the cutting free of the fillets by two cuts on the back and two on the belly were the only known method stages retained.

The complete new method according to the invention consists of the steps of a preliminary alignment of the fish by external engagement at several points, followed by a final alignment by angular or roof-shaped engagement of the head from the mouth and the beheading operation which at the same time severs the belly cavity and the ribs, whereupon the fish is centered by its tail root or caudal vertebra, held by gripping the flat bone (hypuralia) adjoining the tail fin and filleted in known manner by four cuts, whereupon the filleting cuts are extended towards the flat bone, then, after centering the backbone by means of rolling guide tools, the strips of flesh between the fillets and the backbone are severed along their entire length and the two fillets separated from the root of the tail.

Details of the individual stages of the method are explained in the following description of an embodiment of the invention illustrated diagrammatically by way of example in the accompanying drawings, in which FIG. 1 is a perspective view illustrating a machine for carrying out the whole method;

FIGS. 2 and 3 are diagrams showing the centering or alignment of the fish;

FIGS. 4 and 5 illustrate the beheading of a fish;

FIGS. 6 and 7 are diagrams showing the extension of the filleting cuts and the centering of the backbone;

FIGS. 8 to 10 are diagrams showing the centering of the root of the tail and the clipping of the backbone end flat member, and FIGS. 11 to 19 are diagrams illustrating a fish in different stages of the method.

Figure 1:
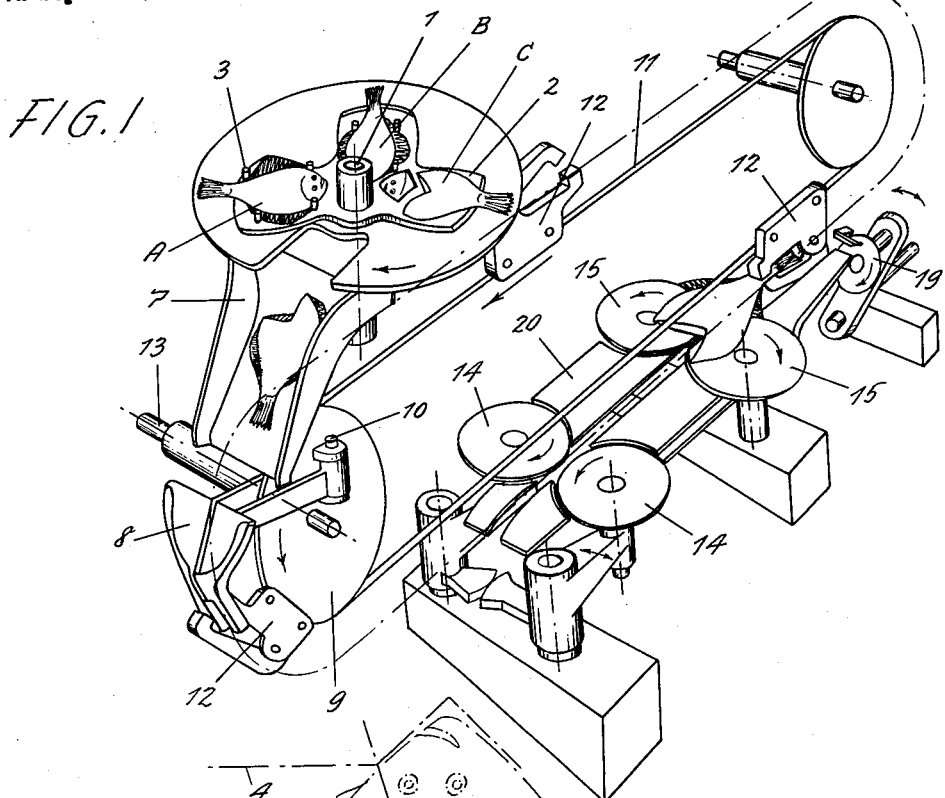

The general view of the apparatus for carrying out the method illustrated in FIG. 1 is intended to explain the individual stages without being confined to technical details as regards construction. These details, in as far as they are necessary, will become apparent either from the different views or from the description itself.

Figure 2:
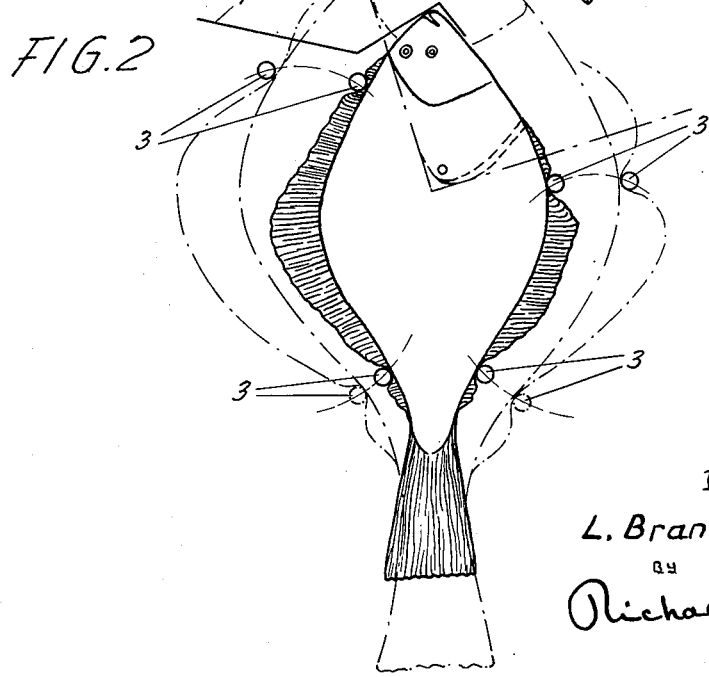

For the placing, preliminary centering, final centering and beheading of the fish a segment plate 2 is provided which is rotatable about an axle 1 and on which external centering devices are mounted at the places where the fish are introduced, these devices being in the present instance in the form of four pins or rollers 3 distributed around and engaging the periphery of the fish. The kinematic movement of these pins or rollers 3 can be seen from FIG. 3. FIG. 2 shows how with the aid of the pins or rollers 3 each fish is gripped at four points on its periphery so that fishes of all sizes lie with their longitudinal axes in the same position. Their bodies thus rest in the proper position. In FIG. 2 a small fish is shown in full lines and a large fish in dot-dash lines. The kinematic adjustment of the centering pins or rollers 3 to the size of the fish can naturally be effected either by hand or by the fish itself.

While the pins or rollers 3 hold the fish centered perfectly, at four points of its periphery, irrespectively of its size, a head guide 4 is provided for the final centering operation, as shown clearly in FIGS. 2 and 3. This head guide 4 is approximately in the shape of a right angle guide 4 and externally engages the mouth of the fish in roof shape. FIG. 2 shows particularly that, owing to the peculiar shape of the head of a flat fish, the roof-shaped engagement of the head guide 4 affords absolutely reliable fixation also for the head for carrying out the head cut, that is, the head guide 4 has the same effect for the head of the fish as the pins or rollers 3 for the body thereof.

The kinematic movement of the head guide 4 is effected in a similar manner to the kinematic movement of the pins or rollers 3. This is clearly shown in FIG. 3. As the kinematic movements of the pins or rollers 3 and the guide 4 are similar they can advantageously be carried out at the same place, as can be seen from FIGS. 2 and 3. However, the preliminary centering by the pins or rollers 3 and the final centering by the head guide 4 can also be carried out at different places, in which case only the control for the head guide 4 need be separate from the control for the pins or rollers 3. Referring to FIG. 1, it is possible, for example, to place the fish in position at A and there carry out both the preliminary centering and the final centering, but the final centering might also be effected at B. Moreover A might be used for placing the fish and both centering operations carried out at B.

The beheading operation shown in FIGS. 4 and 5 and carried out at C in FIG. 1, is effected with the aid of an angular knife 5 so that simultaneously with the head, the belly cavity and the vertebral extensions on the vertebrae of the backbone are cut off. FIG. 2 shows clearly that, as a result of the centering being effected from the outer side by means of the pins or rollers 3, and the head guide 4, and of the angular punch cut, the beheading cuts for all the different sizes of fish are correctly located. The line of the punch cut is indicated by broken lines while the various types of fish are shown in dot-dash lines in FIG. 2.

When the fish has been beheaded it is guided with the aid of a chute 7 into a centering pocket 8 which brings the tail of the fish into a central position for gripping with a clip. Each centering pocket 8 consists of two symmetrical parts which are pivoted about axles 10 on a sprocket wheel 9 driven synchronously with the segment plate 2, so that the centering pockets 8 can be opened and again closed for the tail clips 12 to run in and out. The tail clips arriving on the upper strand of a conveyor chain 11 circulate in synchronism with the centering pockets 8 so that each fish entering a centering pocket is centered by means of the root of its tail in such a manner that the tail clip 12 closing below the sprocket wheel axle 13 reliably grips and firmly holds the fish by the flat bone adjoining the tail fin.

Figure 10:
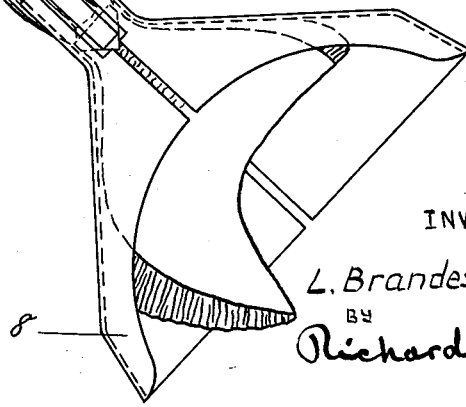

To ensure such reliable gripping, the tail clip and its bedplate are of special construction, being provided with intersecting grooves. The arrangement and operation of the tail clips is shown more clearly in FIGS. 8 and 10. The dorsal and belly muscles of the fish are cut free by the pair of knives 14 (FIGS. 1 and 6) in the well known manner. To cut free the lappets located in front of the tail clip out of range of the knives, disc-shaped guide tools 15 rotating in synchronism with the tail clips are arranged in pairs. These are recessed at 16 for the passage of the tail clips, provided with cutting edges at 17 and so arranged that their peripheries are only a few millimeters apart. They thus serve simultaneously for centering the backbones located between them and for conveying the fish by engaging the vertebrae.

Closely following the tail clips 12, a pair of cutters 18 is provided for piercing and severing the strips of flesh on both sides of the backbone. A tail knife 19 swings in just behind the tail clip and separates the fillets and bones from the tail fin. It is evident that the fillets can also be severed from the backbone by other tools, when the backbone and tail fin will drop out in one piece.

Figure 6:
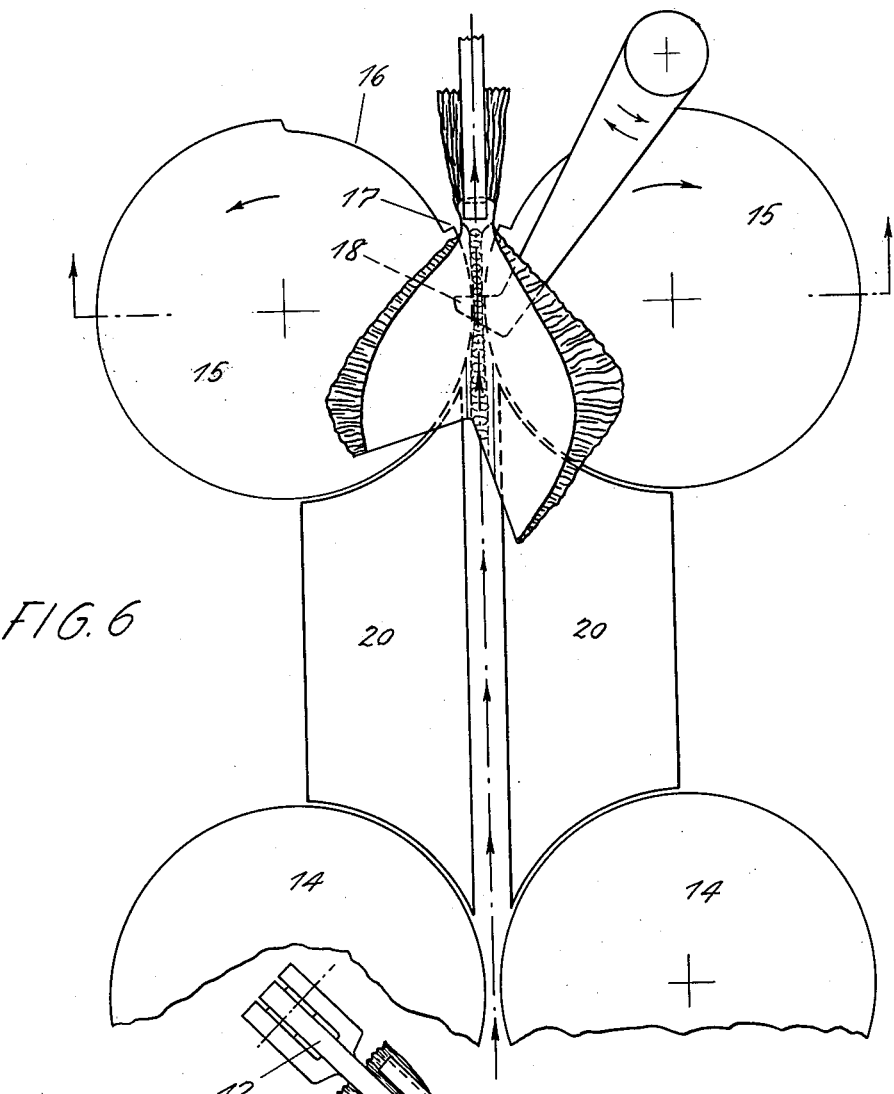

To ensure perfect gripping by the guiding tools 15 following the cut carried out by the pair of knives 14, the severed fillet parts are led off over rigid guides 20 (FIG. 6). If the tail fin knife is used, the fillets and backbone drop out separately whereas the tail fin drops when the tail clip opens. If the fillets are separated from the backbone, they drop out and backbone with the tail fin drops out when the tail clip opens.

In order to more clearly illustrate the effect of the method on a fish, FIGS. 11 to 19 show a fish in the individual stages of working, the technical means being, for the sake of clearness, only indicated diagrammatically where necessary.

FIG. 11 shows the centering or alignment of the fish from the outside with the aid of the centering rollers or pins 3 and the head guide 4. The cutting off of the head and the belly cavity with the vertebral extensions is illustrated in FIG. 12. In FIG. 13 the centering of the root of the tail with the aid of the centering pockets 8 is shown, the tail clip 12 having already run into the pocket and closed after the root of the tail has been centered by the centering pocket 8, and FIG. 14 shows how the tail clip engages exactly on the flat bone adjoining the tail fin.

The fish is now in the position ready for carrying out the actual filleting operations. First the fish flesh is cut open by two cuts on the back and two on the belly, as shown in FIG. 15. These cuts are then extended towards the clip 12 gripping the flat bone and at the same time the backbone is centered as shown in FIG. 16 so as to enable the strips of flesh on both sides of the backbone to be severed in a perfect manner as illustrated in FIG. 17. This is followed by the separation of the fillets from the root of the tail, as shown in FIG. 18 so that the fish is now divided into four parts, namely the two fillet halves, the backbone and the tail fin. The severed fillet halves are illustrated in FIG. 19.

We claim:

1. Method of filleting flat fish, consisting in preliminarily centering the fish by externally engaging the fish at several points, finally centering the fish by gripping the head from the mouth in a roof-shaped embrace, beheading the fish while simultaneously severing the belly cavity and the ribs, then centering the fish at the root of the tail, holding the flat end vertebra adjoining the tail fin and filleting the fish by two cuts on the back and two cuts on the belly, extending the filleting cuts towards the flat vertebra, centering the backbone vertebrae, severing the strips of flesh between the fillets and the backbone along their entire length, and separating the two fillet halves from the root of the tail.

2. Method according to claim 1, wherein the centering for the beheading cut is effected by engagement at four points distributed around the periphery of the fish, the fish being firmly held with its longitudinal axis immovable.

3. Method according to claim 1, wherein the beheading is effected by an angular cut so that, simultaneously with the head, the belly cavity and vertebral extensions on the vertebrae of the backbone are cut off.

4. Method according to claim 1, wherein after the centering the fish is held at the flat bone adjacent the tail fin.

References Cited in the file of this patent

UNITED STATES PATENTS

| | | |
|---|---|---|
| 2,149,022 | Hunt | Feb. 28, 1939 |
| 2,230,281 | Baader et al. | Feb. 4, 1941 |
| 2,353,654 | Danielsson | July 18, 1944 |
| 2,479,010 | Jones | Aug. 16, 1949 |